US008165130B2

(12) United States Patent
Alfano et al.

(10) Patent No.: US 8,165,130 B2
(45) Date of Patent: Apr. 24, 2012

(54) METHOD AND SYSTEM FOR DATA MANAGEMENT IN COMMUNICATION NETWORKS

(75) Inventors: Rosario Alfano, Turin (IT); Antonio Manzalini, Turin (IT)

(73) Assignee: Telecom Italia S.p.A., Milan (IT)

( * ) Notice: Subject to any disclaimer, the term of this patent is extended or adjusted under 35 U.S.C. 154(b) by 128 days.

(21) Appl. No.: 12/452,398

(22) PCT Filed: Jul. 2, 2007

(86) PCT No.: PCT/EP2007/005827
§ 371 (c)(1),
(2), (4) Date: Dec. 29, 2009

(87) PCT Pub. No.: WO2009/003501
PCT Pub. Date: Jan. 8, 2009

(65) Prior Publication Data
US 2010/0128731 A1 May 27, 2010

(51) Int. Cl.
*H04L 12/28* (2006.01)
(52) U.S. Cl. .................. 370/395.1; 370/225; 370/255; 370/328; 370/400; 370/449; 455/41.2
(58) Field of Classification Search .................. 370/225, 370/252, 253, 254, 255, 256, 257, 258, 328, 370/329, 338, 400, 401, 449, 395.1; 455/41.2
See application file for complete search history.

(56) References Cited

U.S. PATENT DOCUMENTS
6,069,896 A    5/2000  Borgstahl et al.
6,421,347 B1 *  7/2002  Borgstahl et al. ............. 370/401
6,535,498 B1 *  3/2003  Larsson et al. ................ 370/338
(Continued)

FOREIGN PATENT DOCUMENTS
WO    WO 98/17032    4/1998

OTHER PUBLICATIONS
Sasikanth et al.; "Data and Services for Mobile Computing", Practical Handbook of Internet Computing, CRC Press LLC, M.P. Singh ed., pp. i-ii and 1-18, (2004).
(Continued)

*Primary Examiner* — Ayaz Sheikh
*Assistant Examiner* — Andrew C Lee
(74) *Attorney, Agent, or Firm* — Finnegan, Henderson, Farabow, Garrett & Dunner, L.L.P.

(57) ABSTRACT

A method for operating a node of a communication network including a plurality of peer-to-peer nodes, the node being linked with predetermined neighbor nodes among the plurality of peer-to-peer nodes, includes: a) storing, on a first storage area, node information indicative of predetermined data required by the node to become an information provider node; b) waiting to receive from at least one information provider node of the neighbor nodes describing information of data that can be provided by the information provider node; c) at the receipt of the describing information from the at least one information provider node, checking in the first storage area if the data that can be provided by the at least one information provider node match at least in part the predetermined data required by the node; d) in the affirmative, deleting in the first storage area the node information indicative of the matching data; and e) in the negative, forwarding the describing information received in c) to at least one of the plurality of peer-to-peer nodes.

25 Claims, 3 Drawing Sheets

U.S. PATENT DOCUMENTS

| | | | |
|---|---|---|---|
| 6,775,258 B1 * | 8/2004 | van Valkenburg et al. | 370/338 |
| 6,842,460 B1 * | 1/2005 | Olkkonen et al. | 370/465 |
| 6,925,064 B2 * | 8/2005 | Hester et al. | 370/255 |
| 7,016,325 B2 * | 3/2006 | Beasley et al. | 370/331 |
| 7,072,650 B2 * | 7/2006 | Stanforth | 455/426.2 |
| 7,532,594 B2 * | 5/2009 | Lin et al. | 370/329 |
| 7,546,086 B2 * | 6/2009 | Hansson | 455/41.2 |
| 7,680,073 B2 * | 3/2010 | Jamieson et al. | 370/328 |
| 7,860,019 B2 * | 12/2010 | Zhang et al. | 370/252 |
| 7,937,088 B2 * | 5/2011 | Nanda | 455/445 |
| 2004/0233855 A1 * | 11/2004 | Gutierrez et al. | 370/252 |
| 2004/0266348 A1 | 12/2004 | Deshpane et al. | |
| 2006/0239190 A1 | 10/2006 | Kumar et al. | |
| 2008/0112325 A1 * | 5/2008 | Sivakumar et al. | 370/238 |

OTHER PUBLICATIONS

Perich et al.; "Data Management for Mobile Ad-Hoc Networks", InBook, Enabling Technologies for Wireless e-Business Applications, W Kou and Yelena Yesha ed., Springer Pub., pp. i-ii and 1-37, (2004).

International Search Report from the European Patent Office for International Application No. PCT/EP2007/005827, mailed Apr. 9, 2008.

* cited by examiner

METHOD AND SYSTEM FOR DATA MANAGEMENT IN COMMUNICATION NETWORKS

CROSS REFERENCE TO RELATED APPLICATION

This application is a national phase application based on PCT/EP2007/005827, filed Jul. 2, 2007, the content of which is incorporated herein by reference.

BACKGROUND OF THE INVENTION

1. Field of the Invention

The present invention relates to a method and system for data management in communication networks.

2. Description of the Related Art

As stated by Sasikanth, Avancha et al. ("Data and Services for Mobile Computing", Practical Handbook of Internet Computing, M. P. Singh ed., pages 1-18) the term "computing device" or "computer" usually evokes the image of a big, powerful machine located in an office or home, that is always on and possibly connected to the Internet. The advent and phenomenal growth of low-cost, lightweight, portable, easily and constantly available devices, even when one is on the move, has altered this image. The combination of device mobility and computing power has resulted in the Mobile Computing paradigm. The smaller the devices, the greater their portability and mobility, but lesser their computing capability.

Accordingly, evolutionary service scenarios (e.g. in near-future cities, industrial/financial areas, etc.) will be characterized by proliferation of different portable devices like cell phones, PDAs, laptops, sensors, RFID (Radio Frequency Identification) tags and other miniaturized transmitters, commonly and increasingly linked by wired and wireless connectivity.

Digital devices, miniaturized and highly dispersed handsets are expected to create a blanket of interconnected resources that can offer huge amounts of data available to capture "social" dynamics/needs. These data, properly collected, correlated and managed are valuable to enable more effective service execution and provisioning. For example, mobile devices could interact with their neighbours and act as both information producer and consumer according to needs.

The scenario described above allows envisioning a pervasive digital environment, very dynamic and data intensive where everyone can exchange information and collaborate to each others and where large amounts of highly distributed data items should be transformed, into meaningful, reliable and available information that each user can access anytime and anywhere using its mobile device.

Traditional data management models are not suitable to manage a so high dynamic and distributed environment strongly characterized by: data variation in space and time; lack of a global schema; and no guarantee about the duration of a connection among any pair of mobile devices.

In such an environment a data management layer adapted to enable a device to interact and exchange data with other devices located in its vicinity and elsewhere on the network, whilst ensuring the proper level of robustness, scalability and reliability, is strongly required.

The ultimate goal of the mobile computing paradigm is enabling people to accomplish tasks using computing devices, anytime, anywhere.

In order to address these requirements in the environment outlined above, the following challenging factors have to be taken into account: data are stored in heterogeneous devices; data are geographically distributed; data sources and user applications are mobile; data sources appear and disappear in an unpredictable way; data can have different meaning based on different usage and elaboration.

Data management layer in mobile computing applications deals with access, storage, monitoring, and data manipulation. This layer enables a device to interact and exchange data with other devices located in its vicinity and elsewhere on the network.

In order to allow a device to compute what information the device needs, when the device needs it, and how it can obtain the information, Filip Perich et al. ("Data Management for Mobile Ad-Hoc Networks", InBook, Enabling Technologies for Wireless e-Business Applications, July 2005, W Kou and Yelena Yesha ed., Springer pub.) disclose a MoGATU peer-to-peer data management model for mobile ad-hoc networks.

As stated by Filip Perich et al., in a peer-to-peer model, all devices, mobile and static, are treated as peers. Mobile devices act as both servers and clients. Ad-hoc networking technologies, such as Bluetooth, allow mobile devices to utilize peer resources in their vicinity in addition to accessing servers on the wired network. Server mobility is, however, an important issue in this model. The set of services available to a client is dynamically changing with respect to location and time. Consequently, for obtaining data, devices cannot simply depend on a help of a fixed centralized server. Instead the devices must be able to cooperate with others in their vicinity in order to pursue individual and collective tasks. This allows devices to become more autonomous, dynamic and adaptive with respect to their environments.

The MoGATU model abstracts each peer device in terms of Information Providers, Information Consumers, and Information Managers.

Information Provider represent the available data sources. They represent entities able to accept some query and to generate proper response. Every Information Provider holds a partial distributed set, a fragment, of heterogeneous data available in the whole mobile ad-hoc network. Every device may hold one or more Information Providers.

Information Consumers represent entities that query and update data available in the environment. Information Consumers can represent human users asking their mobile devices for context-sensitive-information but also represent autonomous software agents. When a consumer needs to obtain a specific data, the consumer constructs an explicit query and sends it to its local Information Manager. The Manager routes the query to appropriate local Information Providers or other matching Providers located on remote peer devices for processing, and awaits a response.

Information Managers on every mobile device are responsible for network communication and for most of the data management functions. Each information Manager maintains information about Information Providers and Information Consumers present on the same device as the Information Manager. Each Information Manager also maintains information about peers in its vicinity. This information includes the identity of devices—a unique identification number similar to an Internet Protocol address, and types of information they can provide, i.e., Provider advertisements. Lastly, Information Manager maintains a data cache for storing information obtained from other mobile devices as well as the information provided by its local Providers, i.e., answers to previous queries. Additionally, each Information Manager may include a user profile reflecting the user's preferences and needs. The Information Manager uses the profile to adapt its caching strategy and to initiate collaboration with peers in order to obtain missing required information.

At a high complexity level, an Information Manager must be able to maintain information about multiple local and remote Information Providers, parse messages, route messages to other peer devices and pro-actively query peers. The MoGATU framework supports at the same time push and pull based approaches, i.e., each Information Manager can advertise its capabilities from solicit capabilities of other peers.

SUMMARY OF THE INVENTION

The Applicant faced the problem of providing an improved method and system for peer-to-peer data management in a communication network.

The Applicant perceived that this object could be accomplished with a method and system wherein: each information provider node of a mobile peer-to-peer network is adapted to proactively send to its neighbor nodes describing information indicative of data that it is capable to provide, as soon as the information is available; and any node receiving said describing information is adapted to decide whether to exploit it or to eventually forward it. In this way, if a node needs predetermined data to become an information provider node, it doesn't need to look for it and doesn't need to waste time looking for information not available (highly probable in a dynamic environment). If available somewhere, the needed information will reach the node sooner or later.

The benefit of this mechanism is twofold: the system is able to ensure proper information where needed and at the same time it is be able to self-adapt to highly dynamic and variable environments.

In a first aspect, the present invention thus relates to a method for operating a node of a communication network comprising a plurality of peer-to-peer nodes, the node being linked with predetermined neighbour nodes among said plurality of peer-to-peer nodes, the method comprising:

a) storing, on a first storage area, node information indicative of predetermined data required by the node to become an information provider node;
b) waiting to receive from at least one information provider node of the neighbour nodes describing information of data that can be provided by said at least one information provider node;
c) at the receipt of said describing information from said at least one information provider node, checking in said first storage area if the data that can be provided by said at least one information provider node match at least in part the predetermined data required by the node;
d) in the affirmative, deleting in the first storage area the node information indicative of the matching data;
e) in the negative, forwarding the describing information received in c) to at least one of the plurality of peer-to-peer nodes.

In the present description and claims the expression "information provider node" is used to indicate a node that is capable of providing data to another node or device and/or to a user.

The term "link" is used to indicate a logical connection between two nodes. The logical connection is established over a physical connection, that can be wired and/or wireless (e.g., LAN, Internet, Wi-Fi, etc. . . . ).

In its turn, the expression "to link" is used to indicate the establishment of a logical connection between two nodes.

When a link is established between two nodes it is assumed that the two nodes can exchange data/information according to a predefined communication protocol as, for example, TCP/UDP, HTTP, and/or a communication protocol as, for example, defined by the standard IEEE 802.11.

Moreover, the expression "neighbour node" is used to indicate a node connected by a logical link to a given node. Preferably, the term neighbour is referred to one-hop neighbours.

The invention is particularly advantageous for a dynamic communication network wherein at least part of the peer-to-peer nodes are mobile nodes and there is no guarantee about the duration of a connection among any pair of mobile nodes.

According to a preferred embodiment, the method further comprises a1) receiving from at least one requiring node of the neighbour nodes, neighbour information indicative of predetermined data required by said at least one requiring node to become an information provider node.

In this embodiment, the method advantageously further comprises a2) storing the neighbour information received in a1) in a second storage area.

In this case, at the receipt of said describing information from said information provider node and before the execution of e), the method advantageously also comprises f) checking in said second storage area if the data that can be provided by said information provider node match at least in part the predetermined data required by the requiring node.

In the affirmative case of f), the method further comprises deleting in the second storage area the neighbour information indicative of the matching data and sending the describing information received in c) to the requiring, node. In this case, the method advantageously further comprises requesting the information provider node to link itself with the requiring node.

In the negative case of f), step e) is executed.

According to an embodiment, in e) the at least one of the plurality of peer-to-peer nodes to which the describing information received in c) is forwarded to, is a randomly selected node among the plurality of peer-to-peer nodes.

Advantageously, in e) the at least one of the plurality of peer-to-peer nodes to which the describing information received in c) is forwarded to, is a node different from the neighbour nodes.

According to a preferred embodiment, in e) the at least one of the plurality of peer-to-peer nodes to which the describing information received in c) is forwarded to, is a neighbour node of one of the neighbour nodes. In this case, the method advantageously comprises requesting any of the neighbour nodes for data identifying at least one of its neighbour nodes.

Advantageously, e) further comprises requesting the information provider node to link itself with the at least one of the plurality of peer-to-peer nodes to which the describing information received in c) is forwarded to. Moreover, e) advantageously further comprises requesting the information provider node to delete its link with the node. Moreover, e) advantageously further comprises deleting the link of the node with the information provider node. Moreover, e) advantageously further comprises linking the node with the at least one of the plurality of peer-to-peer nodes to which the describing information received in c) is forwarded to.

Preferably, a) further comprises sending to the plurality of neighbour nodes the node information indicative of said predetermined data required by the node. In this case, d) advantageously further comprises notifying the plurality of neighbour nodes about the matching data.

Advantageously, d) further comprises requesting the information provider node for the data that can be provided by it. Advantageously, the method further comprises receiving the data that can be provided by the information provider node.

Advantageously, d) further comprises g) checking in said first storage area if all the predetermined data required by the node to become an information provider node matched. In the affirmative case of g), the node becomes an information provider node capable to provide predetermined data. The method advantageously comprises sending to at least part of the neighbour nodes describing information of the predetermined data that can be provided by the node. Advantageously, the describing information of the predetermined data that can be provided by the node is sent to the neighbour nodes other than information provider nodes. In the affirmative case of g), the method advantageously also comprises notifying the plurality of neighbour nodes that all the predetermined data required by the node matched.

In the negative case of g), the method advantageously returns to the execution of b).

Advantageously, the method further comprises processing the data received from the information provider node(s) to obtain said predetermined data that can be provided by the node.

When, in the affirmative case of g), information is received indicative of predetermined data required by a requiring node of the neighbour nodes, the method further comprises sending to the requiring node the describing information of data that can be provided by the node.

When, in the affirmative case of g), at least part of the predetermined data required to become an information provider node fail (e.g., because staled or lost), the method returns to the execution of a).

When, in the affirmative case of g), a request is received to link the node with a node of the plurality of peer-to-peer nodes, the method advantageously comprises creating a link with said node and sending the describing information of the data that can be provided by the node to the newly linked node.

When, in the affirmative case of g), describing information is received of data that can be provided by an information provider node of the neighbour nodes, the method advantageously comprises deleting the link with said information provider node.

Advantageously, data are sent and received through wired and/or wireless technologies. Typical examples of wireless technologies are Bluetooth, Wi-Fi, Wi-Max, UMTS, GSM and similar technologies.

The mobile network may cover a city, an industrial or financial area, an airport, a train-station, an office, a residential area, and similar environments.

The nodes may comprise devices as a cell phones, personal digital assistants (PDAs), laptops, sensors, RFID tags, digital audio devices (iPod), portable game console and similar devices.

In a second aspect, the present invention relates to a node of a communication network, the node being adapted to establish a link with predetermined neighbour nodes among a plurality of peer-to-peer nodes of the communication network, the node comprising a first storage area and modules adapted to:
a) store, on said first storage area, node information indicative of predetermined data required by the node to become an information provider node;
b) wait to receive from at least one information provider node of the linked neighbour nodes describing information of data that can be provided by said information provider node;
c) at the receipt of said describing information from said at least one information provider node, checking in said first storage area if the data that can be provided by said at least one information provider node match at least in part the predetermined data required by the node;
d) in the affirmative, deleting in the first storage area the node information indicative of the matching data;
e) in the negative, forwarding the describing information received in c) to at least one of the plurality of peer-to-peer nodes.

In a third aspect, the present invention relates to a communication network comprising a plurality of peer-to-peer nodes, each node being adapted to establish a link with predetermined neighbour nodes among the plurality of peer-to-peer nodes of the communication network, wherein at least one of said plurality of peer-to-peer nodes requiring predetermined data to become an information provider node comprises modules adapted to:
a) store, on a first storage area, node information indicative of said predetermined data required by the node to become an information provider node;
b) wait to receive from at least one information provider node of the linked neighbour nodes describing information of data that can be provided by said at least one information provider node;
c) at the receipt of said describing information from said at least one information provider node, checking in said first storage area if the data that can be provided by said information provider node match at least in part the predetermined data required by the node;
d) in the affirmative, deleting in the first storage area the node information indicative of the matching data;
e) in the negative, forwarding the describing information received in c) to at least one of the plurality of peer-to-peer nodes;
and wherein at least one information provider node of said plurality of peer-to-peer nodes, that is able to provide predetermined data, comprises modules adapted to send to at least part of the respective neighbour nodes describing information indicative of said data that it is able to provide.

As far as concerns additional features of the second and third aspect of the invention, reference is made to what already disclosed above with reference to the first aspect of the invention.

BRIEF DESCRIPTION OF THE DRAWINGS

The features and advantages of the present invention will be made apparent by the following detailed description of some exemplary embodiments thereof, provided merely by way of non-limiting examples, description that will be conducted by making reference to the attached drawings, wherein.

DETAILED DESCRIPTION OF THE INVENTION

Figure 1:
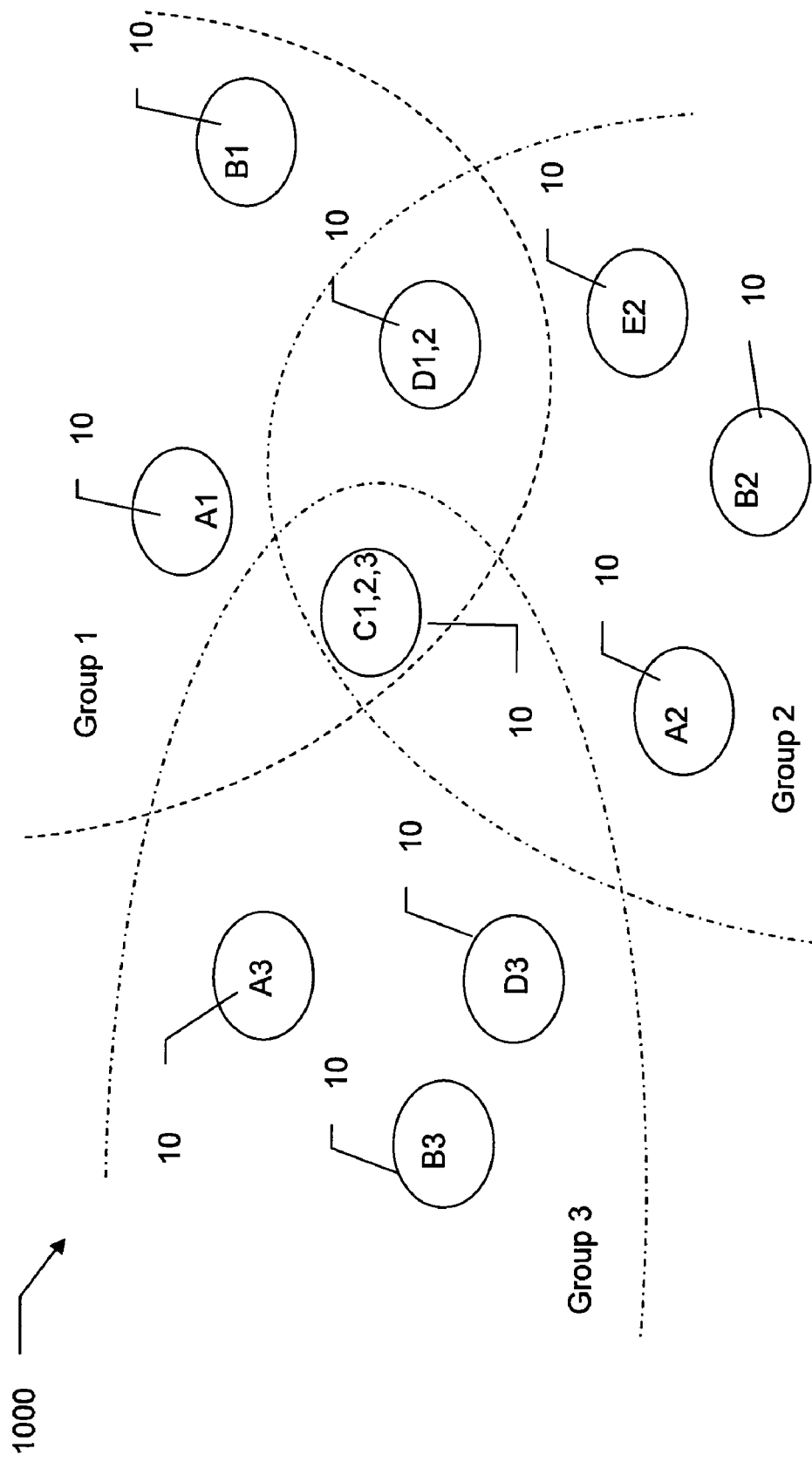
FIG. 1 schematically shows an embodiment of a communication network according to the invention.

FIG. 1 shows a communication network 1000 according to an embodiment of the invention. According to this embodiment, the communication network 1000 is a mobile ad-hoc network comprising a plurality of autonomic and proactive peer-to-peer nodes 10.

An autonomic node indicates a node adapted to manage predetermined features (as configuration, healing, optimization, performance, application specific tasks) without direct human intervention thus guaranteeing (by interaction with other similar nodes) an overall systems reaction also to unpredictable stimuli.

A proactive node indicates a node adapted to send information to other nodes of the mobile network on its own initiative, without the need to be prompted by an explicit request of said nodes.

A node 10 can be a mobile or fixed device as, for example, a cell phone, a PDA, a laptop, a sensor (e.g., a temperature, geographical position, traffic or pollution sensor) or a RFID tag.

Each node 10 is linked with a corresponding plurality of neighbour nodes. In FIG. 1 the nodes 10 are exemplary shown in three (open) groups of neighbour nodes (group 1, group 2, and group 3). Each node may belong to one or more groups and is linked to the nodes of the group(s) it belongs to. For example, node A1 is linked with nodes B1; C1,2,3 and D1,2; node C1,2,3 is linked to nodes A1, B1; D1,2; A2; B2; E2; A3; B3 and D3, and so on.

For example, at the start up each node 10 is provided with a node identifier in order to be able to start peer-to-peer communication with the other nodes, according to techniques known in the art depending upon the technology used for physically connecting the nodes. Then, each node may keep a local list of the identifiers of the neighbour nodes with which it has established a peer-to-peer communication. The creation or deletion of a link with a given node may be carried out by adding or deleting into or from said local list the identifier of the given node.

It is assumed that nodes 10 are adapted to exchange data according to a common communication protocol.

For example, the nodes may be physically connected through a LAN, Internet, Wi-Fi, Bluetooth and/or similar wired and/or wireless technologies.

Each node 10 comprises software, hardware and/or firmware modules adapted to implement the invention according to the various aspects thereof.

Figure 2:
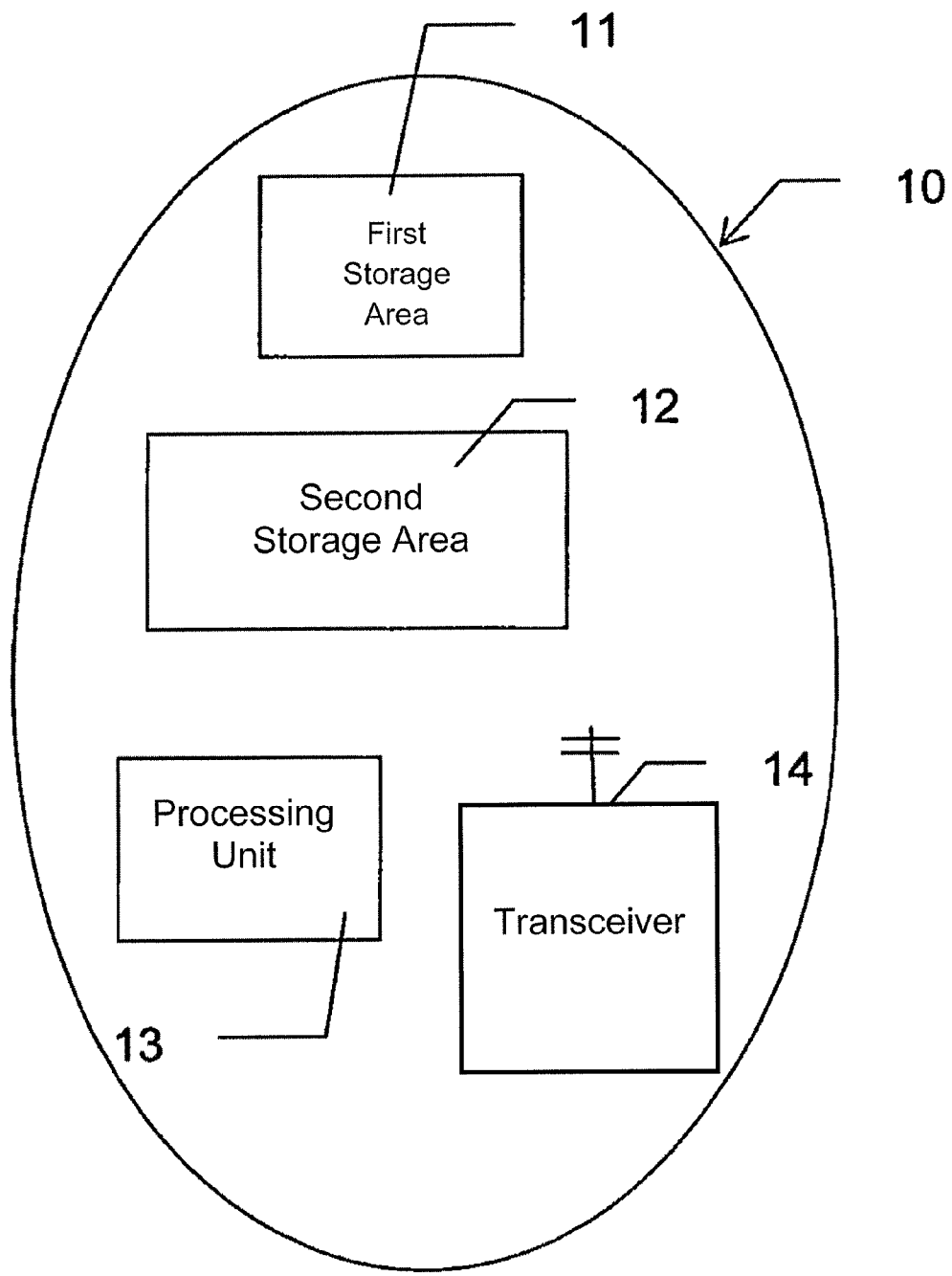
FIG. 2 schematically shows an embodiment of a communication network node according to the invention.

In the block diagram of FIG. 2, each node 10 exemplary comprises a first storage area 11, a second storage area 12, a processing unit 13 and a transceiver 14 adapted to send/receive information to/from the other nodes 10 of the mobile network 1000.

In general, according to the invention, each node 10 that needs some data in order to be able to become an information provider node is adapted to publish information indicative of the needed data on a local data structure, hereinafter called "blackboard", stored in said first storage area 11. Moreover, each node is advantageously adapted to publish also information indicative of data required by its neighbour nodes on a further local data structure, hereinafter called "neighbour's blackboard", stored in the second storage area 12.

On the other hand, as soon as possible, once capable of providing predetermined data, each node 10 is adapted to send describing information indicative of the data it is capable to provide to all its neighbour nodes.

The term "information" may indicate peace of data at different level of elaboration, starting from row information to highly correlated, elaborated knowledge.

The term "blackboard" may indicate a data structure capable to store tuples (record fields) and to match tuples. Two tuples match on the blackboard when their content are comparable (e.g. they contain exactly the same fields).

When a node (e.g., D1,2) receives describing information from an information provider neighbour node (e.g., B1) it performs the following actions:

it checks on its own blackboard if it needs the data that can be provided by said information provider neighbour node. In the affirmative, it deletes in its own blackboard the node information indicative of the matching data and tries to retrieve the needed data from the information provider neighbour node;

it checks on the blackboards of its neighbours (A1; C1,2,3; A2; B2; E2) if there is a neighbour node needing the data that can be provided by the information provider neighbour node (e.g., B1). In the affirmative, it forwards the describing information to the matching neighbour node (e.g., E2). Moreover, it advantageously asks the information provider neighbour node (B1) to create a direct link with the matching neighbour (E2) (that is, to add the matching neighbour's identifier in its local list of neighbour nodes);

if the describing information match neither the information needed by the node nor that of any neighbour node, it randomly selects a neighbor node (e.g., C1,2,3) from its local list of neighbour nodes and asks the randomly selected node (C1,2,3) to provide it with at least one identifier of one of its neighbours (e.g., B3). In order to avoid to receive an identifier of one of its neighbour nodes, the node (D1,2) may send the randomly selected node (C1,2,3) its local list of neighbour nodes asking for an identifier of a node other than its neighbour nodes. After the node (D1,2) receives the identifier of the neighbour's neighbour (B3), it use it to forward the describing information to neighbour's neighbour (B3); and asks the information provider neighbour node (B1) to delete the link with the node (D1,2) and to create a new link with the neighbour's neighbour (B3). Moreover, also the node (D1,2) deletes its link with the information provider neighbour node (B1) and create a new link with the neighbour's neighbour (B3). This allows to maintain an homogeneous number of active links between nodes, when required by the specific application.

Figure 3:
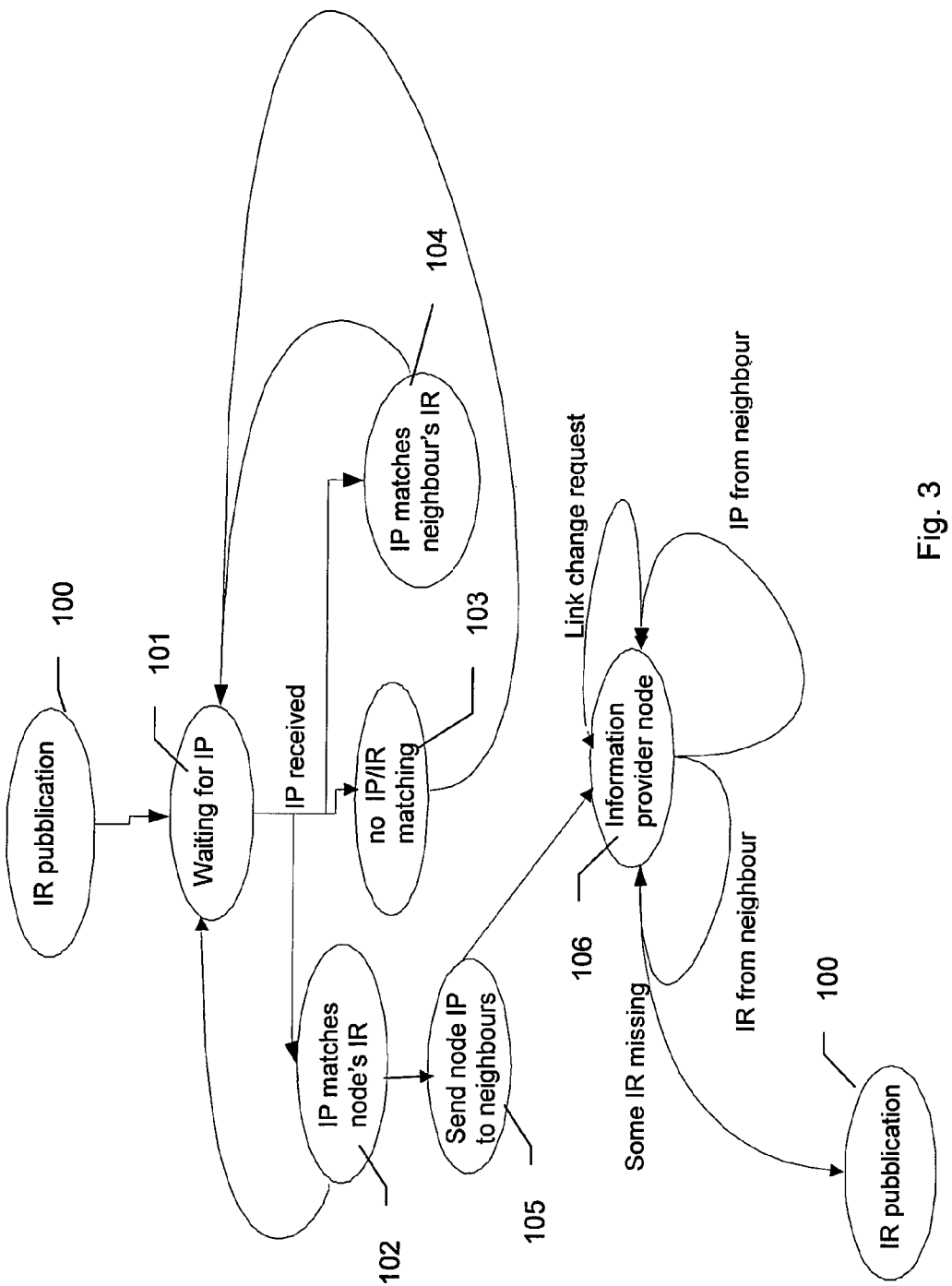
FIG. 3 schematically shows an exemplary state machine outlining the basic protocol states and transitions of a communication network node according to the invention.

FIG. 3 shows an exemplary state machine outlining the principal protocol states and transitions of a node 10 of the mobile network 1000.

In FIG. 3, IP and IR stand, respectively, for Information Provided and Information Required. IP indicates the information describing the data a node is capable to provide. IR indicates information describing the data required by a node. The messages exchanged by the nodes 10 containing such information are only descriptive messages (e.g. SQL query, ruleML facts) and do not contain the data. The messages in this format are only aimed at spreading needed information and required information in the mobile network 1000. After an IR/IP matching has taken place the two nodes involved can agree on some method to invoke or transfer the data needed/provided.

In state 100, node 10 publishes on its own blackboard node information (IR) indicative of predetermined data it needs to become an information provider node; sends the node information (IR) indicative of the predetermined data it needs to its neighbour nodes; receives from the neighbour nodes neighbour information (IR) indicative of predetermined data required by them and stores said neighbour information in respective neighbour's blackboards.

In state 101, node 10 waits to receive from an information provider node of the neighbour nodes describing information (IP) of data that can be provided by said information provider node.

At the receipt of said describing information (IP) from one information provider node, the node 10 checks in its own blackboard and in the neighbour's blackboards if the data that can be provided by said information provider node (IP) match at least in part the predetermined data required by the node (IR) and/or by a neighbour node.

If the data that can be provided by said information provider node match at least in part the predetermined data required by a neighbour node, in state 104 the node 10 deletes the matched data from the neighbour's blackboard, forwards the describing information (IP) to the matching neighbour node, and requests the information provider node to create a link with the matching neighbour node (e.g., by providing the identifier of the matching neighbour node to the information provider node).

If the data that can be provided by said information provider node match neither the predetermined data required by the node nor that required by any neighbour node, in state 103 node 10 randomly selects a neighbour node from its local list of neighbour nodes and asks the randomly selected node to provide it with an identifier of one of its neighbour nodes. After the node 10 receives the identifier of the neighbour's neighbour, it forwards the describing information to the identified neighbour's neighbour. Moreover, it asks the information provider neighbour node to create a new link with the neighbour's neighbour (e.g., by providing the identifier of the neighbour's neighbour to the information provider node) and to delete the link with the node 10. Lastly, the node 10 deletes its link with the information provider node and links itself to the neighbour's neighbour. As stated above, this allows to maintain an homogeneous number of active links between nodes.

If the data that can be provided by said information provider node match at least in part the predetermined data required by the node 10, in state 102 the node 10 deletes the matched data from its own blackboard and notifies its neighbour nodes about the matching. Moreover, it will contact the information provider node to agree on some method to transfer the needed data to the node 10.

When all the information indicative of the predetermined data required by the node 10 to become an information provider node has been deleted in the node's blackboard, it implies that the node 10 has found all the predetermined data required to become an information provider node. The node 10 is thus ready to become an information provider node. Accordingly, in state 105, node 10 sends to its neighbour nodes describing information indicative of the data that it is capable to provide.

If, for any reason, the transfer from the information provider neighbour node(s) of the predetermined data required by the node 10 to become an information provider node does not succeed, the node 10 returns into state 100.

In state 106 the node 10 is an information provider node. In this state node 10 is adapted to send, periodically or upon predetermined conditions (depending on the specific application), the describing information indicative of the data that it is capable to provide.

In state 106, when information describing data that can be provided by one of its neighbour nodes is received, the nodes 10 deletes the link with said neighbour node (the node, being an information provider node, doesn't need to receive any more information).

Accordingly, node 10 advantageously sends the describing information only to the neighbour nodes that are waiting to receive predetermined data information.

In this state 106, when information indicative of predetermined data required by one of its the neighbour nodes (IR) is received, the node 10 sends to the neighbour node the describing information of data that can be provided by the node (IP).

In state 106, when a request to link the node 10 with a node of the plurality of peer-to-peer nodes of the mobile network is received, the node 10 creates a link with said node and sends the describing information of the data that can be provided by itself to the new linked node.

In state 106, when at least part of the predetermined data required by the node 10 to be an information provider node becomes obsolete or gets lost, the node 10 returns in state 100.

In view of the above description it will be clear that according to the invention:

nodes don't need to waste time looking for information not available (highly probable in a dynamic environment);

nodes don't need to look for the information they need. If available somewhere it will reach them sooner or later;

if a node receives not needed information from a neighbour node, the link between the neighbour node and the node is deleted. Moreover, a new link is created between the neighbour node and a randomly selected node of the mobile network and between the node and the same randomly selected node. This mechanism enables adaptation to dynamic conditions.

The benefit is twofold: the system is able to ensure proper information where needed and at the same time it is able to self-adapt to the highly dynamic environment.

Therefore, according to the invention, highly distributed resources (even commodity servers at low-cost) running autonomic S/W solutions based on distributed self-aggregating, self-organizing components are exploited. This allows high levels of availability also starting from low-cost commodity H/W. In particular, the present invention focuses on the application of autonomic principles to the data management in a highly distributed and mobile environment to achieve emergent data management features and properties from local autonomous behaviour and peer-to-peer collaborations.

For example, the present invention may be used in a urban environment for managing and collecting traffic related data, tourism related data and/or civil-protection related data.

In a urban environment, the nodes may be mobile phones, cars equipped with GSM or wi-fi transceivers, PCs, laptops, PDAs, iPods, traffic sensors, pollution sensors, temperature sensors, and so on.

Dynamics of a city can be captured in real-time by collecting and correlating data (anonymous localization, traffic, pollution, cultural sites, events, etc) provided by heterogeneous sources.

Social patterns, generated by people relationships, represent valuable (anonymous) information for providing situated services even anticipating Users' needs. Services may include pervasive communications, personalized cross-media real-time contents, infotainment, commercial and social information.

These huge amount of data overlooking real cities are offering the chance for developing distributed applications (that need data available at the proper time-space locations in the proper format). In order to achieve that, data should be easily retrieved, elaborated, and correlated in a scalable way. The present invention represents a distributed and scalable solution for achieving this goal.

Users in a city may want to run services on their mobile handsets that require digital local maps enriched with commercial information. In particular basic local maps can be downloaded not only from distributed access points but also from neighbour devices (in this case maps have been enriched by information added by the Users). Maps, which may include also audio files, images, commercial text, can be socially shared by Users in peer-to-peer mode in each area.

Real time information (e.g. traffic jam) can be further correlated. Let's assume a User would like to find the nearest car-shop and the best route to reach it. The map of the area (containing also commercial information of shops) can be downloaded from the device of a neighbour User who added information on the shop. Best route and traffic information is also correlated to the shop location. Let's assume that the car-shops have a virtual representation in a Virtual World. The User may want to pre-access such virtual car-shops to get (from some participants of the virtual word) some preliminary commercial information on the car model, availability and costs.

The invention claimed is:

1. A method for operating a node of a communication network comprising a plurality of peer-to-peer nodes, the node being linked with predetermined neighbour nodes among the plurality of peer-to-peer nodes, comprising:
   storing, in a first storage area, information indicative of predetermined data required by the node to become an information provider node;
   receiving from at least one information provider node, descriptive information of data that can be provided by the information provider node;
   checking based on the received descriptive information of the data and the information stored in the first storage area if the data that can be provided by the at least one information provider node match at least a part of the predetermined data required by the node;
   deleting from the first storage area information indicative of the matching part of the predetermined data, if the data that can be provided by the at least one information provider node match at least the part of the predetermined data required by the node; and
   forwarding the received descriptive information of the data to at least one of the plurality of peer-to-peer nodes, if the data that can be provided by the at least one information provider node does not match at least the part of the predetermined data required by the node.

2. The method according to claim 1, further comprising receiving from at least one requiring node, neighbour information indicative of predetermined data required by the at least one requiring node to become an information provider node.

3. The method according to claim 2, further comprising storing the received neighbour information in a second storage area.

4. The method according to claim 3, at the receipt of the descriptive information of the data from the at least one information provider node and before forwarding the received descriptive information, the method further comprising checking in the second storage area if the data that can be provided by the at least one information provider node match at least a part of the predetermined data required by the requiring node.

5. The method according to claim 4, if the data that can be provided by the at least one information provider node match at least the part of the predetermined data required by the requiring node, the method further comprising deleting in the second storage area, the neighbour information indicative of the matching part of the predetermined data and sending the received descriptive information of the data to the requiring node.

6. The method according to claim 5, further comprising requesting the at least one information provider node to establish a link with the requiring node.

7. The method according to claim 4, if the data that can be provided by the at least one information provider node do not match at least the part of the predetermined data required by the requiring node, the method further comprising forwarding the received descriptive information of the data to at least one of the plurality of peer-to-peer nodes.

8. The method according to claim 1, wherein the at least one of the plurality of peer-to-peer nodes to which the received descriptive information of the data is forwarded, is a node different from the predetermined neighbour nodes.

9. The method according to claim 1, wherein the forwarding of the received descriptive information of the data further comprises requesting the at least one information provider node to establish a link with the at least one of the plurality of peer-to-peer nodes to which the received descriptive information of the data is forwarded.

10. The method according to claim 1, wherein the forwarding of the received descriptive information of the data further comprises requesting the at least one information provider node to eliminate its link with the node.

11. The method according to claim 1, wherein the forwarding of the received descriptive information of the data further comprises eliminating a link of the node with the at least one information provider node.

12. The method according to claim 1, wherein the forwarding of the received descriptive information of the data further comprises linking the node with the at least one of the plurality of peer-to-peer nodes to which the received descriptive information of the data is forwarded.

13. The method according to claim 1, wherein the storing of the information indicative of the predetermined data required by the node further comprises sending to the plurality of predetermined neighbour nodes, the information indicative of the predetermined data required by the node.

14. The method according to claim 13, wherein the deleting of the information indicative of the matching part of the predetermined data from the first storage area further comprises notifying the plurality of neighbour nodes about the matching part of the predetermined data.

15. The method according to claim 1, wherein the deleting of the information indicative of the matching part of the predetermined data from the first storage area further comprises checking in the first storage area if all the predetermined data required by the node to become an information provider node are matched.

16. The method according to claim 15, if all the predetermined data required by the node to become an information provider node are matched, the method further comprising changing the node to be a new information provider node capable of providing the predetermined data.

17. The method according to claim 16, further comprising sending to at least part of the neighbour nodes, descriptive information of the predetermined data that can be provided by the node.

18. The method according to claim 17, wherein the descriptive information of the predetermined data that can be provided by the node is sent to the neighbour nodes other than information provider nodes.

19. The method according to claim 15, if not all the predetermined data required by the node to become an information provider node are matched, the method further comprising waiting to receive the descriptive information of the data from the information provider node.

20. The method according to claim 16, when information indicative of predetermined data required by a requiring node is received, the method further comprising sending to the requiring node descriptive information of the data that can be provided by the node.

21. The method according to claim 16, when at least part of the predetermined data required by the node to become an information provider node fail, the method further comprising returning to the execution of storing the information indicative of the predetermined data.

22. The method according to claim 16, when a request is received to link the node with one of the plurality of peer-to-peer nodes, the method further comprising creating a link with the peer-to-peer node and sending the descriptive information of the data that can be provided by the node to the newly linked peer-to-peer node.

23. The method according to claim 16, when descriptive information of data that can be provided by an information provider node is received, the method further comprising eliminating the link with said information provider node.

24. A node of a communication network comprising a plurality of peer-to-peer nodes, the node comprising:
  a first storage area configured to store information indicative of predetermined data required by the node; and
  a processor configured to:
    receive from at least one information provider node descriptive information of data that can be provided by the at least one information provider node;
    check based on the received descriptive information of the data and the information stored in the first storage area if data that can be provided by said at least one information provider node match at least a part of the predetermined data required by the node;
    delete from the first storage area, information indicative of the matching part of the predetermined data, if the data that can be provided by the at least one information provider node match at least the part of the predetermined data required by the node; and
    forward the received descriptive information of the data to at least one of the plurality of peer-to-peer nodes, if the data that can be provided by the at least one information provider node does not match at least the part of the predetermined data required by the node.

25. A communication network comprising:
  a plurality of peer-to-peer nodes, each node being linked to a predetermined set of neighbour nodes,
  the plurality of peer-to-peer nodes comprising:
    at least one information provider node configured to store data to be provided to other nodes within the communication network and to transmit descriptive information of the data that the at least one information provider node can provide to other nodes;
    at least a node seeking to become another information provider node, the node comprising:
      a first storage area configured to store information indicative of predetermined data required by the node;
      a processor configured to:
        receive from the at least one information provider node the descriptive information of the data that can be provided by the at least one information provider node;
        check based on the received descriptive information of the data and the information stored in the first storage area if the data that can be provided by said at least one information provider node match at least a part of the predetermined data required by the node;
        delete from the first storage area the information indicative of the matching part of the predetermined data, if the data that can be provided by the at least one information provider node match at least the part of the predetermined data required by the node; and
        forward the received descriptive information of the data to at least one of the plurality of peer-to-peer nodes, if the data that can be provided by the at least one information provider node does not match at least the part of the predetermined data required by the node.

* * * * *